March 8, 1927.
W. WILKINSON
1,619,909
SEPARATION OF THE CONSTITUENTS OF TERNARY GASEOUS MIXTURES
Filed Oct. 15, 1925
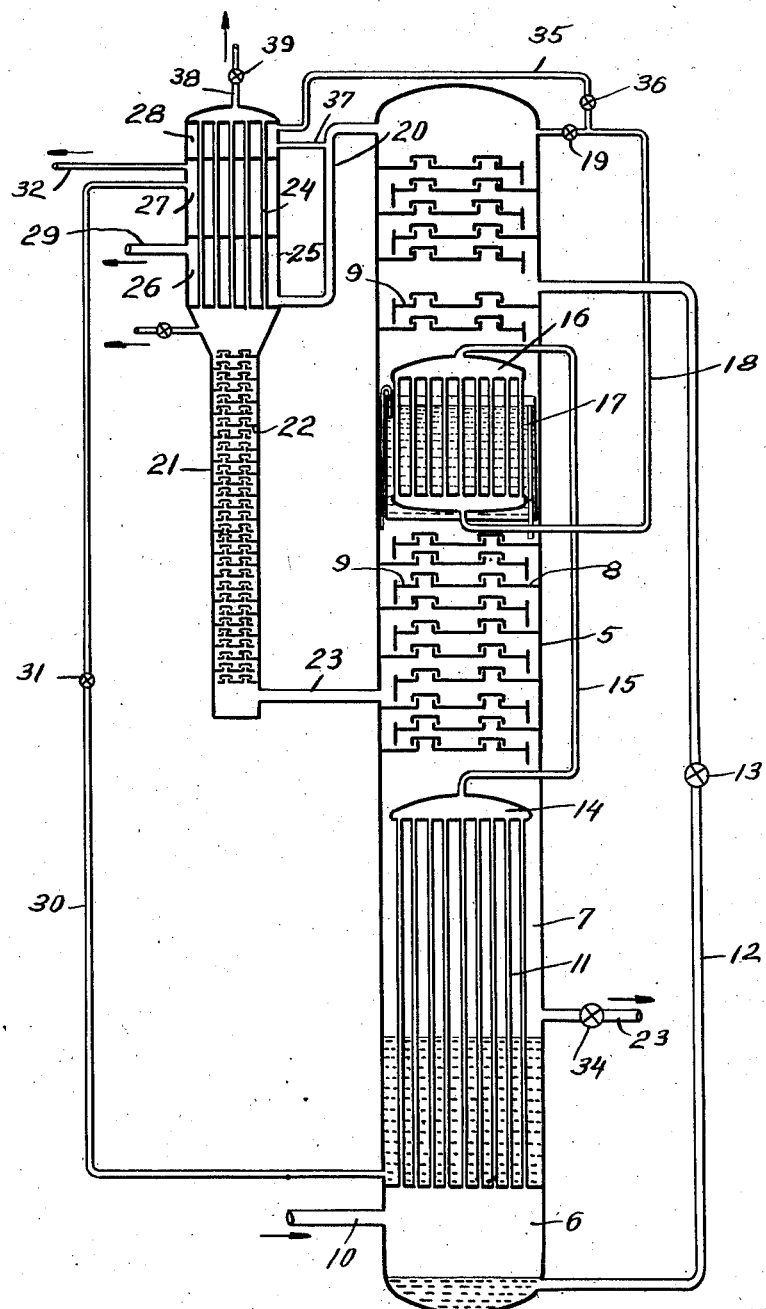
INVENTOR
Walter Wilkinson
BY
Pennie Davis, Marvin & Edmonds
ATTORNEYS Patented Mar. 8, 1927.

1,619,909

UNITED STATES PATENT OFFICE.

WALTER WILKINSON, OF JERSEY CITY, NEW JERSEY, ASSIGNOR TO AIR REDUCTION COMPANY, INCORPORATED, OF NEW YORK, N. Y., A CORPORATION OF NEW YORK.

SEPARATION OF THE CONSTITUENTS OF TERNARY GASEOUS MIXTURES.

Application filed October 15, 1925. Serial No. 62,509.

This invention relates to the separation of the constituents of ternary gaseous mixtures, being adaptable especially for the separation of the elements of atmospheric air. For the purpose of the following explanation the air will be considered to consist of approximately 20.8% of oxygen, 78.2% of nitrogen and 1% of argon by volume. The minute quantities of the rarer elements which do not affect materially the composition of the products obtained in the separation of oxygen and the other more important constituents of air will not be considered.

There are several well known methods of separating atmospheric air into oxygen and nitrogen by first compressing and cooling the air, causing liquefaction of all or a part thereof and subsequently rectifying the liquid produced by causing vapors therefrom to travel counter-current to a stream of the liquid in an apparatus known as a rectifier or a rectification column. Usually no attempt is made to separate the argon which amounts to about 1% by volume of the air. Argon has a boiling point about three degrees below that of oxygen and about ten degrees above that of nitrogen. Consequently in the rectification the argon tends to follow the oxygen to the lower level of the rectifier and thus contaminates the oxygen product, reducing its purity to a very considerable extent. If the attempt is made to overcome this tendency by causing a greater volume of vapor to ascend in the rectifier, the quantity of the oxygen product at the lower end of the rectifier is decreased owing to the loss of oxygen with the nitrogen effluent at the top of the rectifier. Improvement in the quality of the oxygen is attained thus only at a considerable sacrifice in the yield.

It is known that the concentration of argon in both the liquid and vapors increases materially at a certain level in the rectification column. Advantage has been taken of this fact to separate argon. In one case the vapor is withdrawn at the lower level of the rectification column and is subjected to cooling in a coil or other heat exchanger with which colder liquids at higher levels of the rectification column are in contact. This causes a separation of a portion of the oxygen present in the vapors and produces a gaseous mixture of oxygen and argon with slight traces of nitrogen, the mixture being richer than the vapors in the column. Another method involves the withdrawal of all of the liquid from the bottom of the rectification column and the further treatment thereof in an auxiliary column where the liquid is subjected to vapors rising from the accumulated body of liquid oxygen. To ensure the most complete separation it is necessary to withdraw and recompress the effluent from the auxiliary column. The latter method involves the additional expense of providing and maintaining the auxiliary column and the cost of recompressing the effluent therefrom. While it produces an oxygen product of very high purity which is substantially free from argon, the additional expense is a matter of considerable moment in the commercial production of the gaseous constituents of air.

It is the object of the present invention to provide a simple and effective method of and apparatus for separating ternary gaseous mixtures, and particularly for the production of substantially pure oxygen and incidentally a gas consisting principally of argon. The method and apparatus hereinafter described avoid difficulties and expenses incidental to the separation of such constituents by methods heretofore known because the apparatus employed is inexpensive and requires no application of power to maintain it in operation.

The invention depends upon the enrichment in argon of the vapors rising in a rectification column, particularly at the lower part thereof where the maximum enrichment exists and in carrying out the invention these vapors are withdrawn from the column and subjected to a further treatment for the purpose of separating the oxygen content thereof, leaving the argon in the gaseous phase to be withdrawn while the oxygen in the liquid phase is returned to the rectification column. The separation is accomplished by a rectification of the vapors in contact with liquefied portions thereof which are produced by heat exchange with cold products, either gaseous or liquid, of the primary rectification. The heat exchange is carried out preferably upon the principle of backward return condensation which causes selective liquefaction of the oxygen content of the vapors leaving the argon to escape as such and substantially free from oxygen. The liquid produced contains some argon as well as oxygen, but a further separation is accomplished by the passage of the liquid downwardly over the trays of the auxiliary rectifier in contact with the vapors introduced thereto from the primary rectifier. In thus passing the liquid and vapors in counter-current contact, the more readily liquefiable constituent oxygen tends to pass into the liquid phase and to descend over the plates with the liquid while the less readily liquefiable argon separates from the liquid and rises through the trays of the rectifier, and after passing through the tubes of the condenser is withdrawn as the product of the operation. The liquid oxygen from the bottom of the auxiliary rectifier returns to the primary rectifier and descends over the trays thereof with the remaining liquid produced by the primary rectification. The result is an oxygen product which is substantially free from argon and is consequently of very high purity.

The cooling of the condenser to separate oxygen from the vapors rising from the auxiliary rectifier may be accomplished by directing cold products of the primary rectification into the condenser and about the tubes thereof. Either gaseous or liquid products may be employed. For example, the gaseous effluent from the top of the primary rectifier is very cold and can be utilized for this purpose. Liquid nitrogen produced in the primary rectification can also be diverted into the condenser and there vaporized to furnish the necessary refrigeration. Preferably the refrigeration of the condenser is maintained by evaporating therein a portion or all of the liquid oxygen product of the primary rectification. In this event the pressure under which the primary rectification is conducted should be increased slightly and the usual outlet for oxygen vapor at the bottom of the primary rectification column should be closed so that the liquid oxygen can be delivered into a suitable compartment surrounding the tubes of the condenser and there evaporated. The gaseous oxygen product is then withdrawn from the evaporating compartment of the condenser instead of from the oxygen compartment of the primary rectifier.

In carrying out the invention, therefore, any of the known types of apparatus adapted for the separation of oxygen and nitrogen from the atmosphere can be employed with the additional equipment required to separate the argon in the manner described. The air, after compression and cooling in the usual intercoolers and exchangers as is customary in liquefaction operations, can be liquefied either wholly or partially depending upon the particular type of apparatus employed and then subjected to a primary rectification in which the liquid produced in the first step of the method is permitted to descend in contact with vapors rising from the lower part of the column. As in the usual methods, a separation will result in the formation of a liquid consisting substantially of oxygen and an effluent which leaves the top of the rectification column and consists principally of nitrogen. At an intermediate point in the rectification column the rising vapors will contain more argon than the normal proportion in atmospheric air and a part of these rising vapors can be withdrawn continuously and permitted to pass upwardly through a small auxiliary rectification column, the top of which communicates with the tubes of a condenser having the necessary compartments for the refrigerating media. When the auxiliary column is in operation the passage of the rising vapors which have become further enriched in argon in traversing the auxiliary rectification, will be subjected to selective condensation and the liquid thus formed, and consisting principally of oxygen with small amounts of argon, will descend upon the trays of the auxiliary rectification column and thus serve to separate more of the oxygen from the rising vapors which are progressively enriched in argon. The liquid finally descending to the bottom of the auxiliary rectification column will be freed substantially from argon and will reenter the primary rectification column. The removal of the argon improves the rectification in the lower part of the primary column.

In the preferred mode of operation the refrigeration of the condenser at the top of the auxiliary rectification column is accomplished by passing the nitrogen effluent from the top of the primary rectification column through a suitable chamber in the condenser in contact with the tubes thereof and also by supplying to separate compartments liquid products. Either liquid oxygen or nitrogen or both can be withdrawn from the primary rectification column and utilized by evaporation in the condenser to assure the desired selective liquefaction of the gases rising through the tubes therein. By suitably proportioning the amounts of the several refrigerating agents and pressures thereof the necessary temperature to accomplish maximum separation of the argon from the vapors and the return of substantially all of the oxygen to the primary rectification column can be assured.

As an example of the type of apparatus adapted for the successful conduct of the method, the accompanying drawing illustrates diagrammatically primary and auxiliary columns with the condenser attached to the latter. Details of the apparatus which are common in liquefaction systems and are well known to those skilled in the art have been omitted for the purpose of clarity.

Referring to the drawing, 5 indicates a column of the Claude type having compartments 6, 7 and 8, the latter containing the usual rectification trays 9. The air or other gas to be separated enters the compartment 6 through a pipe 10 and passes upwardly through a plurality of tubes 11 disposed in the compartment 7. These tubes are normally surrounded by a body of liquid consisting essentially of oxygen, and during the passage of the air through the tubes selective liquefaction occurs with the separation of a liquid which is materially enriched in oxygen and which accumulates in the compartment 6. This liquid is delivered by a pipe 12 through a pressure-reducing valve 13 to the upper portion of the compartment 8 of the column and flows downwardly over the trays 9 in contact with vapors rising from the bottom of the column. The liquid already partially enriched in oxygen is thus rectified so that it eventually approaches pure oxygen in composition and is finally deposited in the compartment 7 surrounding the tubes 11 where it is partially vaporized to furnish the vapors for the accomplishment of the primary rectification.

The tubes 11 terminate in a head 14 through which residual uncondensed gas from the tubes, and consisting principally of nitrogen, is withdrawn and delivered through a pipe 15 to a condenser 16 having tubes 17 disposed in the middle portion of the compartment 8. The tubes 17 are surrounded by cold liquid descending through the column and the residual gas is subjected thus to refrigeration which results in the liquefaction thereof. The liquid passes upwardly through a pipe 18 and pressure-reducing valve 19 to the upper part of the compartment 8 and descends over the trays 9 therein to accomplish the final separation of oxygen from the vapors rising through the column. A gaseous effluent, consisting therefore principally of nitrogen, escapes through a pipe 20 at the top of the primary column.

To accomplish the separation of the argon an auxiliary column 21 is provided with trays 22 of the usual form and an inlet pipe 23 permits the continuous withdrawal of a portion of the vapors from an intermediate section of the primary rectification column. The auxiliary column 21 communicates at its top with tubes 24 of a condenser 25 having compartments 26, 27 and 28, for example. Consequently the vapors escaping from the uppermost trays of the auxiliary column 21 pass into the tubes 24 and ascend therein in contact with refrigerating agents supplied to the several compartments. Selective liquefaction in the tubes as the result of the refrigeration produces a liquid consisting principally of oxygen since this is the major constituent of the vapors entering the auxiliary column with a small proportion of argon. This liquid descends over the trays 22 of the auxiliary column 21 where additional quantities of argon are separated by means of the rising vapor, the oxygen in the vapor joining the descending liquid so that the liquid approaching the bottom of the auxiliary column is substantially free from argon and consists principally of oxygen. This liquid returns through the pipe 23 to the primary rectification column and descends with the other liquids therein over the trays 9.

The refrigeration in the condenser 25 is accomplished by delivering to the compartments 26, 27 and 28 suitable gaseous or liquid products of the primary rectification. For example, the pipe 20 carrying the effluent from the top of the primary rectification column can be connected to the compartment 26 and after circulating about the tubes 24 of the condenser the nitrogen effluent can be delivered through a pipe 29. As it is still at relatively low temperature it is utilized preferably in the usual temperature exchangers to cool the incoming gaseous air. Likewise, liquid oxygen can be withdrawn from the compartment 7 through a pipe 30 and a valve 31 and delivered to the compartment 27 where it is vaporized in contact with the tubes 24 of the condenser. The vaporized oxygen can be withdrawn as a product of the operation through a pipe 32, and after passing through the usual exchangers the oxygen can be delivered to suitable storage receptacles. If oxygen is used in this way the usual outlet 33 for oxygen vapor from the bottom of the primary rectification column is preferably closed by means of a valve 34 and the primary rectification is conducted at a somewhat higher pressure than is usual in operating such a column without the argon separating equipment. In addition, or alternatively, a portion of the liquid nitrogen from the pipe 18 can be diverted through a pipe 35 controlled by a valve 36 to the compartment 28 of the condenser and after vaporization in the compartment the vapor which is still cold can be delivered through a pipe 37 to the pipe 20, passing thus with the effluent through the compartment 26 and escaping therewith through the pipe 29.

Suitable regulation of the withdrawal of vapors from the primary column and of the distribution of the refrigerating media which can be determined readily by examination of the several products permits the operation of the apparatus in the manner described to produce substantially pure oxygen as the major product, an effluent consisting principally of nitrogen, and a gas consisting principally of argon with possibly some oxygen and a trace of nitrogen. The argon gas is withdrawn through a pipe 38 controlled by a valve 39 and can be delivered through the usual exchangers and thence to storage receptacles.

The method and apparatus thus permit the separation of the important constituents of air in an economical and satisfactory manner, the products being of such purity that they can be utilized for various industrial purposes. The operation is relatively simple and requires an inexpensive addition to the usual apparatus for the separation of oxygen and nitrogen from the atmosphere. The only manipulation which is necessary in conducting the operation is the proper setting of the valves when the operation is initiated and suitable adjustment thereof from time to time as conditions affecting the operation may vary slightly.

While the invention has been described more particularly with reference to the separation of the constituents of atmospheric air, the principles thereof are applicable generally to the separation of constituents of gaseous mixtures in which the relationship of the constituents is similar to that obtaining in air. Consequently the invention is not limited to the treatment of air but must be considered as applying to all gaseous mixtures which are susceptible to separation in accordance with the principles outlined.

Various changes in the details of the apparatus as described as well as in the operation of the method can be introduced without departing from the invention or sacrificing any of the advantages thereof.

I claim:—

1. The method of separating the constituents of ternary gaseous mixtures, which comprises separating the mixture by primary liquefaction and rectification into a liquid consisting principally of the least volatile constituent and a gas consisting principally of the most volatile constituent, withdrawing vapors containing a constituent of intermediate volatility, subjecting the vapors to a thermally remote auxiliary rectification, liquefying the gaseous product of the auxiliary rectification by heat exchange with a cold product of the primary separation, returning the liquid product of the liquefaction to the auxiliary rectification and returning the liquid product of the auxiliary rectification for use in the primary rectification.

2. The method of separating the constituents of ternary gaseous mixtures, which comprises separating the mixture by primary liquefaction and rectification into a liquid consisting principally of the least volatile constituent and a gas consisting principally of the most volatile constituent, withdrawing vapors containing a constituent of intermediate volatility, subjecting the vapors to a thermally remote auxiliary rectification, liquefying the gaseous product of the auxiliary rectification by heat exchange with a cold liquid product of the primary separation, returning the liquid product of the liquefaction to the auxiliary rectification and returning the liquid product of the auxiliary rectification for use in the primary rectification.

3. The method of separating the constituents of ternary gaseous mixtures, which comprises subjecting the mixture to selective liquefaction, separately liquefying the residual vapor, subjecting the product of the selective liquefaction and a portion of the liquefied residual gas to a primary rectification to separate a gas consisting principally of the most volatile constituent and a liquid consisting principally of the least volatile constituent, withdrawing partially rectified vapors containing a constituent of intermediate volatility, subjecting the vapors to a thermally remote auxiliary rectification, liquefying the gaseous product of the auxiliary rectification by heat exchange with the remainder of the said liquefied residual gas, returning the liquid product of the second liquefaction to the auxiliary rectification and returning the liquid product of the auxiliary rectification for use in the primary rectification.

4. The method of separating the constituents of ternary gaseous mixtures, which comprises separating the mixture by primary liquefaction and rectification into a liquid consisting principally of the least volatile constituent and a gas consisting principally of the most volatile constituent, withdrawing vapors containing a constituent of intermediate volatility; subjecting the vapors to a thermally remote auxiliary rectification, selectively liquefying the gaseous product of the auxiliary rectification by heat exchange with a cold product of the primary separation, withdrawing the vapor resulting from the selective liquefaction, returning the liquid product of the selective liquefaction to the auxiliary rectification and returning the liquid product of the auxiliary rectification for use in the primary rectification.

5. The method of separating the constituents of ternary gaseous mixtures, which comprises separating the mixture by primary liquefaction and rectification into a liquid consisting principally of the least volatile constituent and a gas consisting principally of the most volatile constituent, withdrawing vapors containing a constituent of intermediate volatility, subjecting the vapors to a thermally remote auxiliary rectification, selectively liquefying the gaseous product of the auxiliary rectification by heat exchange with a cold liquid product of the primary separation, withdrawing the vapor resulting from the selective liquefaction, returning the liquid product of the selective liquefaction to the auxiliary rectification and returning the liquid product of the auxiliary rectification for use in the primary rectification.

6. The method of separating the constituents of ternary gaseous mixtures, which comprises subjecting the mixture to selective liquefaction, separately liquefying the residual vapor, subjecting the product of the selective liquefaction and a portion of the liquefied residual gas to a primary rectification to separate a gas consisting principally of the most volatile constituent and a liquid consisting principally of the least volatile constituent, withdrawing partially rectified vapors containing a constituent of intermediate volatility, subjecting the vapors to a thermally remote auxiliary rectification, selectively liquefying the gaseous product of the auxiliary rectification by heat exchange with the remainder of the said liquefied residual gas, withdrawing the vapor resulting from the second selective liquefaction, returning the liquid product of the second selective liquefaction to the auxiliary rectification and returning the liquid product of the auxiliary rectification for use in the primary rectification.

7. The method of separating the constituents of ternary gaseous mixtures, which comprises subjecting the mixture to selective liquefaction, separately liquefying the residual vapor, subjecting the product of the selective liquefaction and a portion of the liquefied residual gas to a primary rectification to separate a gas consisting principally of the most volatile constituent and a liquid consisting principally of the least volatile constituent, withdrawing partially rectified vapors containing a constituent of intermediate volatility, subjecting the vapors to a thermally remote auxiliary rectification, selectively liquefying the gaseous product of the auxiliary rectification, first by a heat exchange with a cold gaseous product of the primary rectification, and then by heat exchange with the remainder of the said liquefied residual gas, withdrawing the vapor resulting from the second selective liquefaction, returning the liquid product of the second selective liquefaction to the auxiliary rectification and returning the liquid product of the auxiliary rectification for use in the primary rectification.

In testimony whereof I affix my signature.

WALTER WILKINSON.